United States Patent [19]

Mochida et al.

[11] 4,283,210

[45] Aug. 11, 1981

[54] CERAMIC HONEYCOMB FILTER AND A METHOD OF PRODUCING THE SAME

[75] Inventors: Shigeru Mochida, Kasugai; Takayuki Ogasawara, Konan, both of Japan

[73] Assignee: NGK Insulators, Ltd., Nagoya, Japan

[21] Appl. No.: 167,747

[22] Filed: Jul. 14, 1980

[30] Foreign Application Priority Data

Jun. 16, 1980 [JP] Japan ................. 55-080109

[51] Int. Cl.³ .......................................... C04B 21/00
[52] U.S. Cl. ............................ 55/523; 55/DIG. 30; 210/510; 264/60; 264/DIG. 48
[58] Field of Search .......... 55/523, DIG. 5, DIG. 30; 210/510; 264/60, DIG. 48; 428/116, 118; 106/40 R

[56] References Cited

U.S. PATENT DOCUMENTS

| | | | |
|---|---|---|---|
| 3,156,950 | 11/1964 | Walton, Jr. ................... | 264/60 X |
| 3,680,287 | 8/1972 | Wood et al. .................. | 210/510 X |
| 3,788,486 | 1/1974 | Bergstrom ..................... | 210/510 X |
| 3,899,336 | 8/1975 | Frost et al. .................... | 264/57 X |
| 4,026,746 | 5/1977 | Straw ............................. | 264/60 X |
| 4,181,513 | 1/1980 | Fukuda et al. ................ | 55/528 X |

*Primary Examiner*—William A. Cuchlinski, Jr.
*Attorney, Agent, or Firm*—Stevens, Davis, Miller & Mosher

[57] ABSTRACT

A ceramic honeycomb filter consisting of a porous ceramic honeycomb structural body having a large number of channels extending therethrough, wherein given channels at one of the opening end surfaces of the honeycomb structural body have sealing portions formed by bending and bonding thin partition walls forming the opening end portion of the channels, and the remaining channels have sealing portions formed by bending and bonding thin partition walls forming another opening end portion of the channels, can be produced in a simple manner and is excellent in durability and mass-productivity.

7 Claims, 5 Drawing Figures

CERAMIC HONEYCOMB FILTER AND A METHOD OF PRODUCING THE SAME

The present invention relates to a filter used for removing fine particles contained in a fluid, and more particularly, relates to a porous ceramic honeycomb filter having excellent heat resistance, thermal shock resistance and chemical resistance, which is small in size and large in filter area.

Conventional filters have generally a structure, wherein a fluid containing fine particles is passed through a layer formed of steel wools, fibers, porous porcelains or the like, and the fine particles are caught by these filter elements. However, filters having fine meshes must be used in order to improve the removing efficiency, and in this case, the use of such filters always results disadvantageously in the increase of pressure loss.

The increase of filter area is effective for preventing the increase of pressure loss, but a remarkably large filter area cannot be attained by the use a filter element layer having a corrugated structure, double-cylindrical form or the like, and therefore the size of apparatus is always large.

The present invention relates to a porous ceramic honeycomb filter free from the above described drawbacks and having excellent heat resistance and thermal shock resistance, which is small in size and is large in filter area.

One of the aspects of the present invention lies in a ceramic honeycomb filter consisting of a porous ceramic structural body having a large number of parallel channels extending therethrough, wherein given channels at one of the opening end surfaces of the honeycomb structural body have sealing portions formed by bending and bonding thin partition walls forming the opening end portion of the channels, and the remaining channels have sealing portions formed by bending and bonding thin partition walls forming another opening end portion of the channels.

Another aspect of the present invention lies in a method of producing ceramic honeycomb filters, comprising bending and bonding thin partition walls of given channels at one of the opening end surfaces of a ceramic honeycomb structural body having a large number of parallel channels extending therethrough to seal the channels while the honeycomb structural body still has plasticity, bending and bonding thin partition walls of the remaining channels at another opening end surface of the body to seal the remaining channels, and firing the above treated honeycomb structural body.

The ceramic honeycomb structural body to be used in the present invention has a honeycomb structure having a large number of parallel channels extending therethrough, which are separated from each other by very thin partition walls as shown in FIGS. 1 and 2.

Channels shown in FIGS. 1 and 2 have a tetragonal cross-sectional shape, but ones having a hexagonal, triangular cross-sectional shape or the like may be used in the present invention.

Ceramic honeycomb structural bodies have been recently broadly used for catalyst support for purifying exhaust gas of automobiles, heat exchanger for gas turbine and the like and a larger number of parallel channels extending therethrough having a given shape are uniformly distributed, so that the pressure loss of the gas flow is very small and the surface area per unit volume is large.

Methods for producing ceramic honeycomb structural bodies include various processes, for example, a process wherein a paper is impregnated with a ceramic slurry, the impregnated paper is assembled into a honeycomb structural body and the assembled body is fired; a press process; and an extrusion process, wherein a plastic ceramic raw material is extruded through a die provided with a large number of given-shaped slits. The extrusion process for producing ceramic honeycomb structural bodies will be explained in more detail. An organic binder and a plasticizer are added to fine powders of alumina, silica, mullite, cordierite or a fine raw material mixture having a composition, which can be converted into these compounds by firing, the resulting mixture is kneaded, the homogeneous mixture is extruded into a monolith structure through a die provided with a large number of slits arranged so as to obtain given-shaped parallel channels extending therethrough, and the extruded article is dried and fired to obtain a ceramic honeycomb structural body.

The present invention is based on the following properties of the ceramic honeycomb structural body. The ceramic honeycomb structural body has a remarkably large surface area per unit volume and is a porous ceramic article, and fluid can pass through the thin partition walls. Therefore, the ceramic honeycomb structural body can be used as a carrier for catalyst or used as a filter.

One of the object of the present invention is to provide a ceramic honeycomb filter consisting of a porous ceramic honeycomb structural body having a large number of parallel channels extending therethrough, wherein given channels at one of the opening end surfaces of the honeycomb structural body have sealing portions formed by bending and bonding thin partition walls forming the opening end portion of the channels, and the remaining channels have sealing portions formed by bending and bonding thin partition walls forming another opening end portion of the channels.

Another object of the present invention is to provide a ceramic honeycomb filter consisting of a porous ceramic honeycomb structural body having a large number of channels extending therethrough separated from each other by thin partition walls having a filtering action, wherein non-sealed channels and sealed portions formed of bent thin partition walls are arranged so as to form a checker flag pattern at the end surfaces of the honeycomb filter.

A further object of the present invention is to provide a method of producing ceramic honeycomb filters having a large number of channels extending therethrough separated from each other by porous thin partition walls, comprising bending and bonding thin partition walls of given channels at one of the opening end surfaces of a ceramic honeycomb structural body having a large number of channels to seal the channels while the honeycomb structural body still has plasticity, and bending and bonding thin partition walls of the remaining channels at another opening end surface of the body to seal the remaining channels, whereby a honeycomb structural body having sealed channels and non-sealed channels arranged so as to form a checker flag pattern at the end surface; and firing the above treated honeycomb structural body.

The present invention will be explained in more detail hereinafter.

For a better understanding of the invention, reference is taken to the accompanying drawings, wherein.

Figure 1:
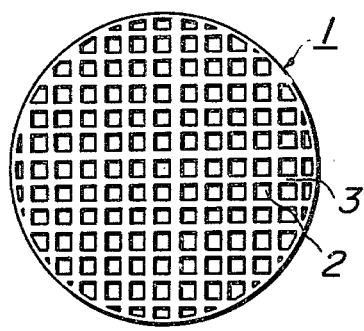
FIG. 1 is a front view of one embodiment of a honeycomb structural body.
Figure 2:
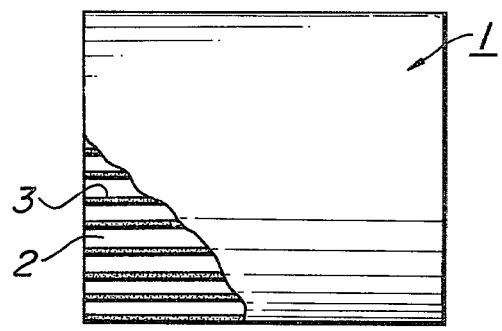
FIG. 2 is a side view, partly in section, of the honeycomb structural body shown in FIG. 1.
Figure 3:
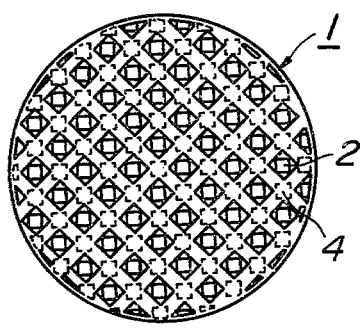
FIG. 3 is a front view of a honeycomb filter according to the present invention.
Figure 4:
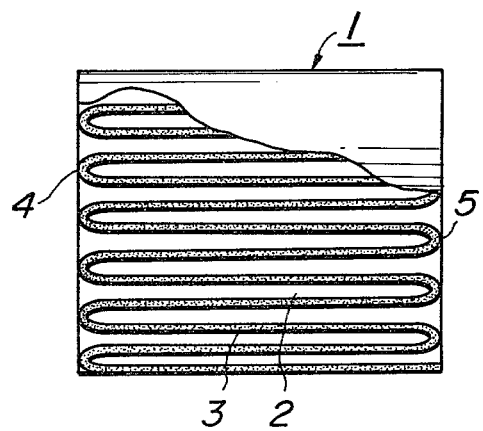
FIG. 4 is a side view, partly in section, of the honeycomb filter shown in FIG. 3.

FIGS. 1 and 2 show one embodiment of a honeycomb structural body having parallel channels 2 extending therethrough, which have a tetragonal cross-sectional shape and are separated from each other by thin partition walls 3. The honeycomb filter shown in FIG. 3 is produced in the following manner. The thin partition walls 3 of alternate channels 2 are expanded to form sealing portions 4 and 5 at both end surfaces of the honeycomb structural body 1, whereby the channels 2 are alternately sealed so as to form a checker flag pattern when the resulting honeycomb filter is viewed from one end thereof. FIG. 4 shows a side view, partly in section, of the honeycomb filter shown in FIG. 3.

When it is intended to form sealing portions 4 and 5 by bending the thin partition wall 2 of a honeycomb structural body 1 at the end surfaces of the body 1, a previously kneaded ceramic raw material is extruded into a honeycomb structural body having a large number of parallel channels extending therethrough, which are separated from each other by thin partition walls formed of porous material, and then tapered portions of a jig are inserted into alternate channels adjacent to given channels to be sealed to bend and bond the end portion of the thin partition walls while the extruded honeycomb structural body still has plasticity, whereby the shape of the end portion of the given channels shown in FIG. 1 is changed into the shape shown in FIG. 3 to form sealing portions. In this case, rod-shaped jig are forcedly inserted into channels to expand the thin partition walls in all directions, whereby the thin partition walls are bent and bonded to form a sealing portion at the top of the walls. When it is intended to form sealing portions arranged in a checker flag pattern by sealing channels having a tetragonal cross-sectional shape, rod-shaped jigs are inserted successively or concurrently into four channels positioned, through thin partition walls, adjacent to given channels to be sealed, and the thin partition walls of the channels to be sealed are bent towards the center portion of the channel to be sealed. It is preferable that rod-shaped jigs having a tapered tip are used and the tips are gradually inserted into the channels to bend gradually the thin partition walls. Further, the sealing portion can be formed in the following manners. That is, rod-shaped jigs are arranged on the outer periphery of a disc or drum so as to be projected therefrom at a predetermined interval or pattern, and the disc or drum is rotated to bend continuously given thin partition walls; or a jig obtained by arranging rod-shaped projections on a flat board at a predetermined interval or pattern is pressed to the end surface of a honeycomb structural body, while the body still has plasticity, to form sealing portions at the same time.

The sealing portion can be also formed in the following method, wherein rod-shaped jigs are arranged on the outer side of thin partition walls of given channels to be sealed, and the rod-shaped portions of the jigs are moved towards the center portion of the channels to be sealed, that is, a method, wherein a jig having a plurality of pincettes is used, and the thin partition walls at the end portion of given channels to be sealed are concurrently bent towards the center of the channels and bonded with each other at the center of the channels by means of the tip portions of the pincettes.

The sealing portion in the honeycomb filter shown in FIG. 3 is formed in the following manner. Rod-shaped projections, each having a frustum of a quadrangular pyramid, which frustum has a tetragonal cross-sectional shape and the cross-sectional area of which frustum is smaller than that of the channels at the top of the frustum, and increases gradually towards the base of the frustum, and is larger than that of the channels at the base, are inserted into alternate channels of a non-fired ceramic honeycomb structural body at such a position that the sides constituting the tetragonal shape are rotated at an angle of 45° with respect to the thin partition walls forming the channels shown in FIG. 1, to bend the thin partition walls forming the alternate channels from four directions to bond the thin walls with each other and to form sealing portions. The above obtained sealing portions and the opening end portions of non-sealed channels form a checker flag pattern as a whole.

The above treated honeycomb structural body having sealing portions is fired to produce a ceramic honeycomb filter. In this case, the sealing portion is formed by the firing concurrently with the firing of the honeycomb structural body.

Figure 5:
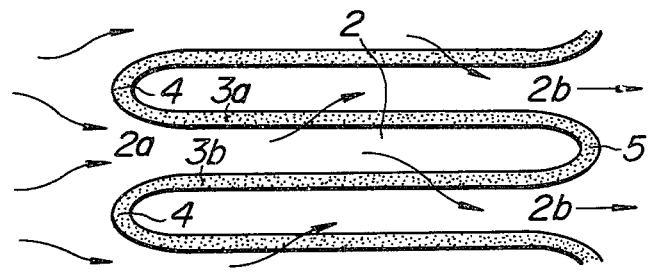
FIG. 5 is a schematic view for explaining the honeycomb filter of the present invention.

Then, the effect of the ceramic honeycomb filter according to the present invention will be explained. FIG. 5 is a schematic view for explaining the filter portion of the ceramic honeycomb filter shown in FIG. 4. In the filter, channels arranged in a direction parallel to the flow direction of dust-containing fluid, and therefore the fluid flowed into the filter through an opening portion 2a at the end surface of the fluid inlet side passes through the thin porous ceramic partition walls 3a and 3b forming the channels due to the structure that another end of the channels is sealed by the sealing portion 5 of channel, and transfers to the adjacent channels, which open at the fluid outlet side, and is discharged from the opening portions 2b. That is, the thin porous partition walls 3 forming the channels 2 act the function of filter.

The following examples are given for the purpose of illustration of this invention and are not intended as limitations thereof.

EXAMPLE 1

A honeycomb filter, in which both ends were sealed in a checker flag pattern by bending thin partition walls at end portion of given channels as shown in FIG. 3, was produced from a cordierite honeycomb structural body having a diameter of 118 mm, a length of 152 mm, a thickness of partition walls of the channels of 0.30 mm and about 200 channels per one square inch.

Just after the extrusion of the honeycomb structural body, rods having a square cross-section and provided with a tapered tip were inserted into channels adajcent to channels to be sealed to expand forcedly the partition walls, whereby the partition walls were bonded with each other to seal the end portion of the channels to be sealed. Then, the above treated honeycomb structural body was fired.

The resulting cordierite honeycomb filter had a porosity of 43%, an average diameter of fine pores of 9 $\mu$m and a filter area of about 1.6 m$^2$, and caused a pressure loss of 60 mmH$_2$O in the case where air at room temperature was flowed at a rate of 2 m$^3$/min.

EXAMPLE 2

A mullite honeycomb structural body having a diameter of 118 mm, a length of 152 mm, a thickness of partition walls of 0.4 mm and about 100 of channels per one square inch was sealed in a checker flag pattern in the same manner as described in Example 1 to produce a mullite honeycomb filter. The resulting filter had a porosity of 40%, an average diameter of fine pores of 14 $\mu$m and a filter area of about 1.1 m$^2$, and caused a pressure loss of 40 mmH$_2$O in the case where air at room temperature was flowed at a rate of 2 m$^3$/min.

As described above, the filter of the present invention has a remarkably large filter area per unit volume due to its honeycomb structure. Further, the filter is formed of a porous ceramic material, and therefore even fine particles contained in a high-temperature gas can be effectively caught, for example, even fine particles contained in exhaust gas of Diesel engine can be effectively caught. Moreover, when the porosity and diameter of fine pores of ceramic material used are changed, fine particles having various sizes can be caught.

Furthermore, in the present invention, in order to obtain a honeycomb filter having a high filtering ability, end portions of thin partition walls forming given channels are bent and bonded with each other to form a sealing portion, and therefore the sealing portion consists of the same material as that of the honeycomb structural body and is formed at the same time with the firing of the honeycomb structural body. Therefore, the ceramic honeycomb filter of the present invention is excellent in durability and in mass-productivity and is very useful in industry.

What is claimed is:

1. A ceramic honeycomb filter consisting of a porous ceramic honeycomb structural body having a large number of channels extending therethrough, wherein given channels at one of the opening end surfaces of the honeycomb structural body have sealing portions formed by bending and bonding thin partition walls forming the opening end portion of the channels, and the remaining channels have sealing portions formed by bending and bonding thin partition walls forming another opening end portion of the channels.

2. The ceramic honeycomb filter as claimed in claim 1, wherein the non-sealed channels and the sealing portions formed to bent thin partition walls are arranged so as to form a checker flag pattern at the end surfaces of the honeycomb filter.

3. A method of producing ceramic honeycomb filters, comprising bending and bonding thin partition walls of given channels at one of the opening end surfaces of a ceramic honeycomb structural body having a large number of parallel channels extending therethrough to seal the channels while the honeycomb structural body still has plasticity, bending and bonding thin partition walls of the remaining channels at another opening end surface of the body to seal the remaining channels, and firing the above treated honeycomb structural body.

4. The method as claimed in claim 3, wherein rods having a tapered tip are inserted into channels adjacent to given channels at the opening end surface of a ceramic honeycomb structural body to expand, bend and bond thin partition walls forming the former channels, whereby the latter given channels are sealed.

5. The method as claimed in claim 3, wherein a jig provided at its peripheral surface at a predetermined interval with rod-shaped projections having a tapered tip is rotated, and the opening end portions of channels adjacent to given channels are successively worked to bend and bond the given thin partition walls to form a sealing portion.

6. The method as claimed in claim 3, wherein a jig having a flat plate provided at its given position with at least one rod-shaped projection having a tapered tip is pressed to the opening end surface of the ceramic honeycomb structural body to bend concurrently thin partition walls of at least one channels, whereby sealing portions are formed.

7. The method as claimed in claim 4, wherein rod-shaped projections arranged on a jig are inserted into channels positioned surrounding thin partition walls forming given channels at the opening end surface of a ceramic honeycomb structural body to bend the thin partition walls forming the given channels towards the interior of the channels, whereby sealing portions are formed.

* * * * *